Patented May 18, 1948

2,441,848

UNITED STATES PATENT OFFICE 2,441,848

STABILIZING ALKYLENE GLYCOLS

Arthur E. Sexton, Midland, Mich., assignor to The Dow Chemical Company, Midland, Mich., a corporation of Delaware No Drawing. Application August 6, 1945, Serial No. 609,320

10 Claims. (Cl. 252—77)

This invention relates to stabilizing lower alkylene glycols against thermal decomposition.

In certain types of aircraft and automotive engines, the liquid coolant, instead of running at the conventional temperature of 100° C. or less, commonly circulates at 150° C. in a closed system, and may occasionally reach 200° C. or higher, perhaps for an extended period. The problem of selecting a coolant which will operate satisfactorily at these temperatures and yet will not freeze even at extreme winter temperatures is a difficult one. Ethylene glycol, undiluted or together with a lesser proportion of water, is most frequently chosen as the coolant, but it has the undesirable property of decomposing slowly at the higher temperatures mentioned to form organic acids, carbon, and gummy tars. These acids, when formed, tend to corrode the metallic parts of the circulating system, and the carbon and tar ultimately foul the heat-transfer surfaces and throttle circulation. In consequence, with ethylene glycol coolants, periodic overhauling of the circulating system is necessary, sometimes at short intervals.

In an effort to provide a more satisfactory liquid coolant for operation at higher temperatures, it has now been found that the lower alkylene glycols, such as ethylene glycol, may be stabilized against thermal decomposition of the type mentioned by incorporating therein a small proportion of a polymethylpyridine containing two or three methyl groups per molecule. These compounds almost completely restrain thermal decomposition of the glycols, both in the undiluted state and in mixtures thereof with the same or a lesser weight of water, at temperatures up to 200° C., and very markedly retard decomposition even when the glycols are maintained liquid under pressure at temperatures as high as 300° C.

Glycol compositions stabilized in accordance with the invention not only are useful as coolants for internal combustion engines but are satisfactory as liquid heat-transfer agents in general at temperatures within the range mentioned. They are characterized by extremely low freezing points, good heat-transfer characteristics, and moderate viscosities, as well as thermal stability. The compositions may also be used as fluid pressure- and power-transmitting media.

The lower alkylene glycols to which the invention is applicable contain from two through five carbon atoms per molecule. Of these, etheylene glycol, and to a lesser extent industrial mixtures of propylene glycols and butylene glycols, are of present commercial interest. Such glycols may be employed according to the invention in the undiluted state or mixed with an equal or lesser weight of water. With larger proportions of water the boiling points of the solutions are somewhat low for a high temperature fluid, and thermal decomposition is rarely a serious problem.

In so far as known, any polymethylpyridine containing two or three methyl groups per molecule, e. g. the lutidines and sym. collidine, may be employed as a stabilizer according to the invention, either as the pure compound or as a crude mixture containing one or more such compounds. Preferred stabilizers are the compound 2,6-lutidine and coal-tar base fractions boiling in the range of 160° to 200° C. Such fractions are prepared by the fractional distillation of crude coaltar bases or "pyridine bases" produced during the distillation of coal in accordance with usual industrial practices. Some bone-oil distillates containing polymethylpyridines may also be used.

The polymethylpyridines are soluble to a moderate extent in the undiluted glycols and their aqueous mixtures and may be incorporated in them simply by stirring. Alternatively, the stabilizer may be made up as a strong solution in a mutual solvent, such as alcohol, and the solution stirred into the glycol. A small proportion of the polymethylpyridine is all that is required to effect stabilization, 0.2 to 5 per cent by weight of the glycol usually being satisfactory, with 0.5 per cent or more being preferred.

The polymethylpyridines, in addition to preventing carbon and tar formation in heated glycols and glycol-water mixtures, also minimize corrosion of metals by these liquids because of the fact that they almost completely restrain development of acidic substances by decomposition of the glycols. They also function to a moderate degree as an inhibitor in the conventional sense of retarding the corrosion of metals by other agents, such as air, which may be dissolved in the glycol solution. However, when extremely corrosive conditions are to be encountered, it is preferable to rely on the polymethylpyridines as thermal stabilizers only, and to introduce in addition a small proportion of a conventional corrosion inhibitor. Since many such inhibitors are themselves unstable or volatile at temperatures of 200° to 300° C., it is important to select an inhibitor which is not affected adversely by heating. Sodium silicate, usually from 0.5 to 5 per cent by weight of the glycol is a preferred choice.

While the heat-transfer media of the invention ordinarily consist of the glycol and the stabilizer, with or without water, minor proportions of other ingredients, such as anti-foaming agents, leak-stopping compounds, and dyes, as well as the conventional inhibitors already mentioned, may be added as desired.

The following examples will serve to illustrate the invention, but are not to be construed as limiting its scope. In the examples, a testing apparatus was employed consisting of an electrically heated closed iron chamber of about 400 cc. capacity and a circulating system for withdrawing the liquid being tested from a reservoir, forcing it under a pressure of 100 to 120 pounds per square inch into one end of the heated chamber, removing it from the other end of the chamber through a relief valve, cooling it, and returning it to the reservoir. The rate of circulation was controlled at about 800 cc. per hour.

end of the run. The losses in weight, calculated as milligrams per hour per square inch of exposed surface, are listed in the table.

From the results listed it will be seen that in the absence of a stabilizer, aqueous ethylene glycol underwent considerable decomposition at 200° C. to form aldehydes and carbon. Each of the stabilizers effectively prevented decomposition and the solution and apparatus remained free of tar and carbon. The rates of corrosion of the metal specimens were extremely low in all the runs.

EXAMPLE II.—UNDILUTED GLYCOL AT 300° C.

Tests similar to those of Example I were carried out on undiluted ethylene glycol, using 0.5 per cent of stabilizer, and maintaining the heated chamber at 300° C. The results are summarized in the table.

From these tests, it is evident that the glycol itself decomposes very rapidly at 300° C. The stabilizers entirely prevented formation of carbon and corrosion of the chamber, and minimized the occurrence of tar and acidity, although some aldehydes are formed. Even under these extremely severe conditions, the marked effectiveness of the stabilizers, and the low rates of corrosion of the metal specimens, are quite apparent.

Table

| Stabilizer | Time, hrs. | Volume, cc. | pH (Start) | pH (Finish) | Appearance | Aldehyde | Tar | Carbon | Corrosion Rate, mgm./hr./sq. in. | | | |
|---|---|---|---|---|---|---|---|---|---|---|---|---|
| | | | | | | | | | Aluminum | Iron | Brass | Copper |
| EXAMPLE I.—70 PER CENT GLYCOL AT 200° C. | | | | | | | | | | | | |
| None | 100 | 2,465 | 7.3 | 5.6 | Rusty | Yes | None | Yes | 0.01 | 0.00 | 0.02 | 0.03 |
| 2,6-lutidine | 100 | 2,570 | 7.6 | 7.1 | Clear yellow | None | do | None | 0.00 | 0.11 | 0.03 | 0.00 |
| Coal-tar base (160°–200° C.) | 100 | 2,580 | 7.2 | 7.0 | do | do | do | do | 0.00 | 0 00 | 0.04 | 0.01 |
| EXAMPLE II.—100 PER CENT GLYCOL AT 300° C. | | | | | | | | | | | | |
| None | [1] 12.5 | 1,029 | 7.0 | 5.8 | Dark brown | Strong | Excessive | Excessive | (Excessive carbonization rendered measurement impossible.) | | | |
| 2,6-lutidine | 100 | 2,250 | 7.4 | 6.0 | Clear green | Yes | None | None | 0.04 | 0.10 | 0.01 | 0.09 |
| Coal-tar base (160°–200° C.) | 100 | 2,260 | 7.15 | 7.2 | do | do | Trace | do | 0.03 | 0.16 | 0.07 | 0.03 |

[1] Discontinued because of excessive decomposition.

Weighed polished test specimens of aluminum, iron, brass, and copper were placed in the heated chamber throughout each run. The purposes of the metal specimens were to have present in the system the metals normally used in liquid-cooled engines and also to observe the rates of corrosion of the metals.

EXAMPLE I.—AQUEOUS MIXTURE AT 200° C.

In each of the test runs summarized in the table, the system was filled with the given volume of a mixture of 70 parts by weight of ethylene glycol and 30 parts of water, to which (except in the case of the blank) 0.5 part of the stabilizer listed was added. The chamber was maintained at 200° C. and circulation of the liquid was continued for the period stated. The pH of the liquid was measured at the beginning and at the end of the test. The appearance of the solution, the occurrence of aldehyde odor, and the presence of carbon and tar in the chamber at the end of the test were noted. These details are given in the table. The metal test specimens present in the chamber were weighed at the start of each run and were reweighed, after polishing, at the

What is claimed is:

1. A heat-transfer medium consisting essentially of a lower alkylene glycol containing from two through five carbon atoms per molecule and not over an equal proportion by weight of water stabilized against thermal decomposition by a polymethylpyridine containing at least two but not over three methyl groups per molecule in a proportion of from 0.2 to 5 percent by weight of the glycol.

2. A heat-transfer medium chemically stable at elevated temperatures consisting essentially of ethylene glycol and from about 0.2 to about 5 per cent by weight thereof of a coal-tar base fraction boiling in the range of 160° to 200° C.

3. A heat-transfer medium chemically stable at elevated temperatures consisting essentially of ethylene glycol and from about 0.2 to about 5 per cent by weight thereof of 2,6-lutidine.

4. A liquid heat-transfer medium chemically stable at elevated temperatures consisting essentially of one part by weight of ethylene glycol, not over one part of water, and 0.005 to 0.05 part of a coal-tar base fraction boiling in the range of 160° to 200° C.

5. A liquid heat-transfer medium chemically stable at elevated temperatures consisting essentially of one part by weight of ethylene glycol, not over one part of water, and 0.005 to 0.05 part of 2,6-lutidine.

6. In a process wherein a heat-transfer medium consisting essentially of a lower alkylene glycol containing from two through five carbon atoms per molecule and not over an equal proportion by weight of water is heated as a liquid for a prolonged period at a temperature above 200° C., the method of minimizing decomposition of the liquid which comprises maintaining dissolved therein a polymethylpyridine containing at least two but not over three methyl groups per molecule in a proportion of from 0.2 to 5 percent by weight of the glycol.

7. In a process wherein ethylene glycol is heated as a liquid at an elevated temperature, the method of minimizing decomposition of the liquid which comprises maintaining dissolved therein from 0.2 to 5 per cent by weight of a coal-tar base fraction boiling in the range of 160° to 200° C.

8. In a process wherein ethylene glycol is heated as a liquid at an elevated temperature, the method of minimizing decomposition of the liquid which comprises maintaining dissolved therein from 0.2 to 5 per cent by weight of 2,6-lutidine.

9. In a process wherein a liquid mixture of ethylene glycol and a lesser proportion of water is heated at an elevated temperature, the method of minimizing decomposition of the liquid which comprises maintaining dissolved therein a coal-tar base fraction boiling in the range of 160° to 200° C. in a proportion of from 0.5 to 5 per cent by weight of the glycol.

10. In a process wherein a liquid mixture of ethylene glycol and a lesser proportion of water is heated at an elevated temperature, the method of minimizing decomposition of the liquid which comprises maintaining dissolved therein 2,6-lutidine in a proportion of from 0.5 to 5 per cent by weight of the glycol.

ARTHUR R. SEXTON.

REFERENCES CITED

The following references are of record in the file of this patent:

UNITED STATES PATENTS

| Number | Name | Date |
|---|---|---|
| 1,851,493 | Calcott et al. | Mar. 29, 1932 |
| 1,903,287 | Cox | Apr. 4, 1933 |
| 1,988,584 | Dana et al. | Jan. 22, 1935 |
| 2,078,256 | Lieber et al. | Apr. 27, 1937 |
| 2,130,924 | Johnson et al. | Sept. 20, 1938 |
| 2,164,564 | Britton et al. | July 4, 1939 |
| 2,268,388 | Funk | Dec. 30, 1941 |